2 Sheets—Sheet 1.

E. DERBY.
TURBINE WATER-WHEEL.

No. 181,646. Patented Aug. 29, 1876.

WITNESSES:
A. W. Almgvist
John Goethals

INVENTOR:
E. Derby
BY
ATTORNEYS.

2 Sheets—Sheet 2.

E. DERBY.
TURBINE WATER-WHEEL.

No. 181,646. Patented Aug. 29, 1876.

WITNESSES:
A. W. Almgvist
John Goethals

INVENTOR:
E. Derby
BY
ATTORNEYS.

UNITED STATES PATENT OFFICE.

EDWARD DERBY, OF RIDGWAY, PENNSYLVANIA.

IMPROVEMENT IN TURBINE WATER-WHEELS.

Specification forming part of Letters Patent No. 181,646, dated August 29, 1876; application filed August 7, 1876.

*To all whom it may concern:*

Figure 1:
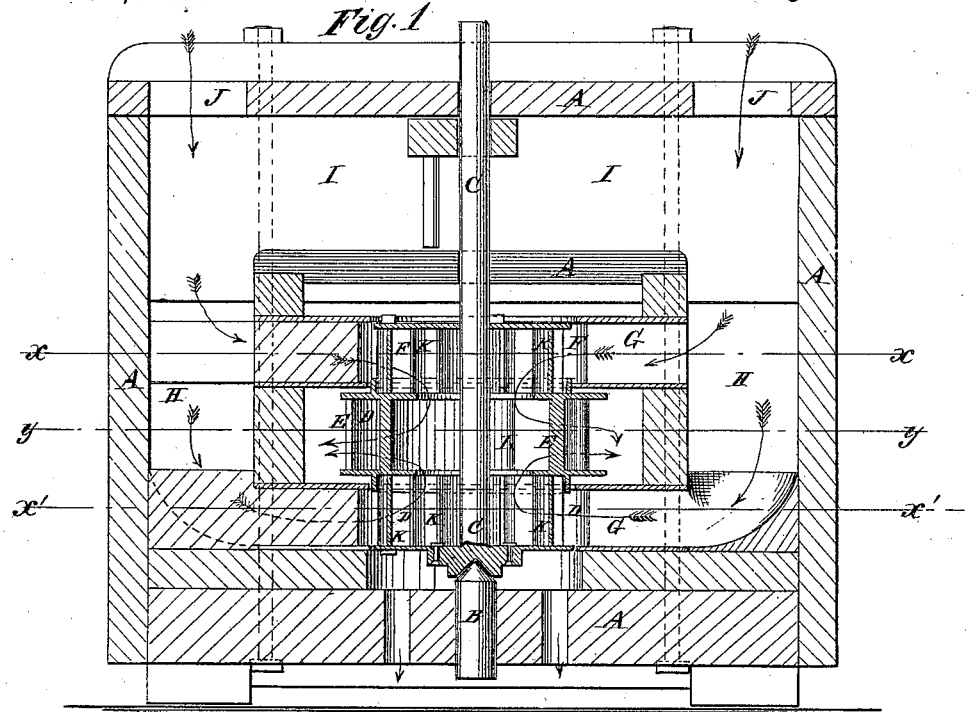
Figure 2:
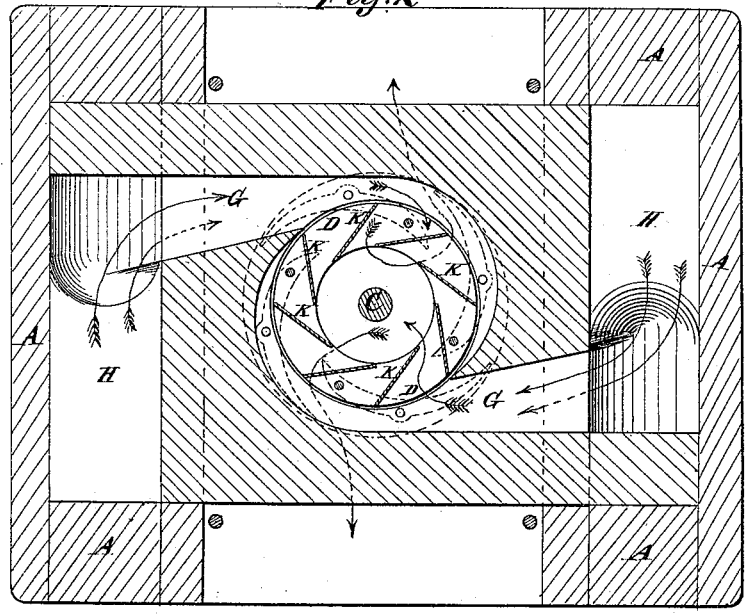
Figure 3:
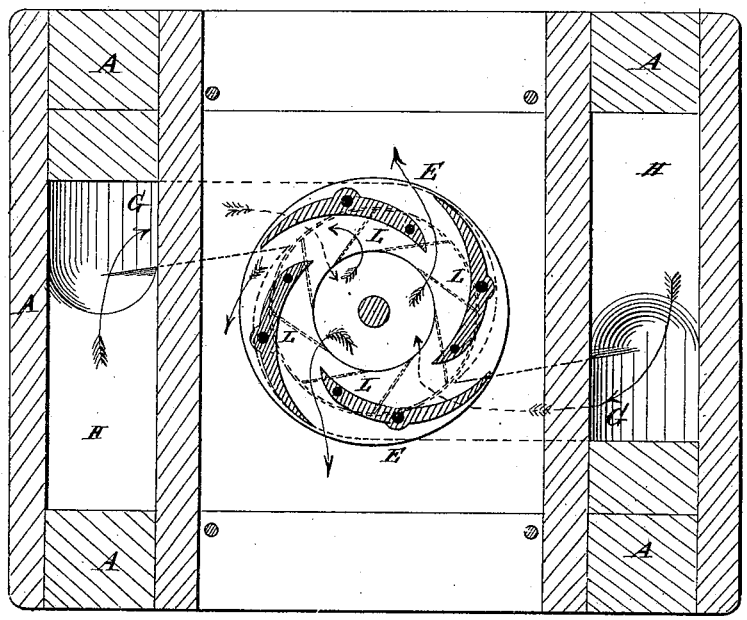

Be it known that I, EDWARD DERBY, of Ridgway, Elk county, Pennsylvania, have invented a new and Improved Water-Wheel, of which the following is a specification:

Figure 1, Sheet 1, is a vertical section of my improved water-wheel. Fig. 2, Sheet 2, is a horizontal section of the same, taken through the lines $x\ x$ and $x'\ x'$, Fig. 1; and Fig. 3, Sheet 2, is a horizontal section taken through line $y\ y$, Fig. 1.

Similar letters of reference indicate corresponding parts.

The object of this invention is to furnish an improved water-wheel, which shall be so constructed as to utilize the entire force of the water, and at the same time balance the thrust upon the shaft, and thus diminish friction.

The invention consists in the combination, of the two direct-action wheels and the central reaction wheel, with the shaft and case, and in the case provided with the chutes, the water-chambers, and the discharge-spaces, as hereinafter described, to adapt it for use with the triple wheel, as set forth.

To the base frame of the casing A is attached the step B, upon which the lower end of the shaft C revolves. To the shaft C are attached three wheels, D E F, which are also rigidly attached to each other. The upper and lower wheels D F are direct-action wheels, and receive water upon their opposite sides through the chutes G from the chambers H, at the opposite ends of the case A. The chambers H communicate with each other through the space I, between the upper and lower decks of the case A, and receive water through openings J in said upper deck. The wheels D F are made with inclined buckets K, along which the water slides and escapes through the center vents into the reaction-wheel E, the water passing up from the wheel D and down from the wheel F, so as to balance the thrust upon the shaft C, and thus lessen the friction. The water enters the wheel E upon both sides of its center, and reacts upon the buckets L of said wheels, so that its whole force will be utilized. The water escapes from the wheel E through the open spaces M in the sides of the case A. The wheels D F are entirely inclosed, except the chute-openings, as shown in Fig. 2. The wheel E is made a little larger than the wheels D F, as shown in Fig. 1, and in dotted lines in Figs. 2 and 3, to counteract its tendency to move faster than the others, to give uniformity of motion to all the wheels.

Having thus described my invention, I claim as new and desire to secure by Letters Patent—

1. The combination of the two direct-action wheels D F and the central reaction-wheel E, with the shaft C and the case A, substantially as herein shown and described.

2. The case A, provided with the chutes G, the water-chambers H I, and the discharge-spaces M, substantially as herein shown and described, to adapt it for use with the triple wheel D E F, as set forth.

EDWARD DERBY.

Witnesses:
ROBERT M. CHAMBERLAIN,
GEO. A. RATHBUN.